Jan. 30, 1923.

D. O. BARRETT.
ENGINE CYLINDER AND HEAD.
FILED NOV. 6, 1919.

WITNESSES

INVENTOR
D. O. BARRETT
ATTORNEYS

Patented Jan. 30, 1923.

1,443,893

UNITED STATES PATENT OFFICE.

DWIGHT ORION BARRETT, OF SPRINGFIELD, OHIO.

ENGINE CYLINDER AND HEAD.

Application filed November 6, 1919. Serial No. 335,995.

*To all whom it may concern:*

Be it known that I, DWIGHT O. BARRETT, a citizen of the United States, and a resident of Springfield, in the county of Clark and State of Ohio, have invented a new and Improved Engine Cylinder and Head, of which the following is a full, clear, and exact description.

This invention relates to internal combustion engines of any desired type either horizontal or vertical; and has for an object the provision of an improved construction whereby the cylinder may be removably connected to a bed in such a manner as to be quickly and easily removed and replaced.

Another object of the invention is to provide an improved construction of cylinder which will be bolted to the bed in one place and form a tight connection at a second place.

A further object of the invention is to provide an overlapping structure for the cylinder bed and an overlapping structure for the cylinder and head whereby the packing gaskets are prevented from blowing out.

A still further object of the invention is the provision of an improved construction of head which is cast integral with the tubular members for receiving the clamping or retaining bolts.

Figure 1:
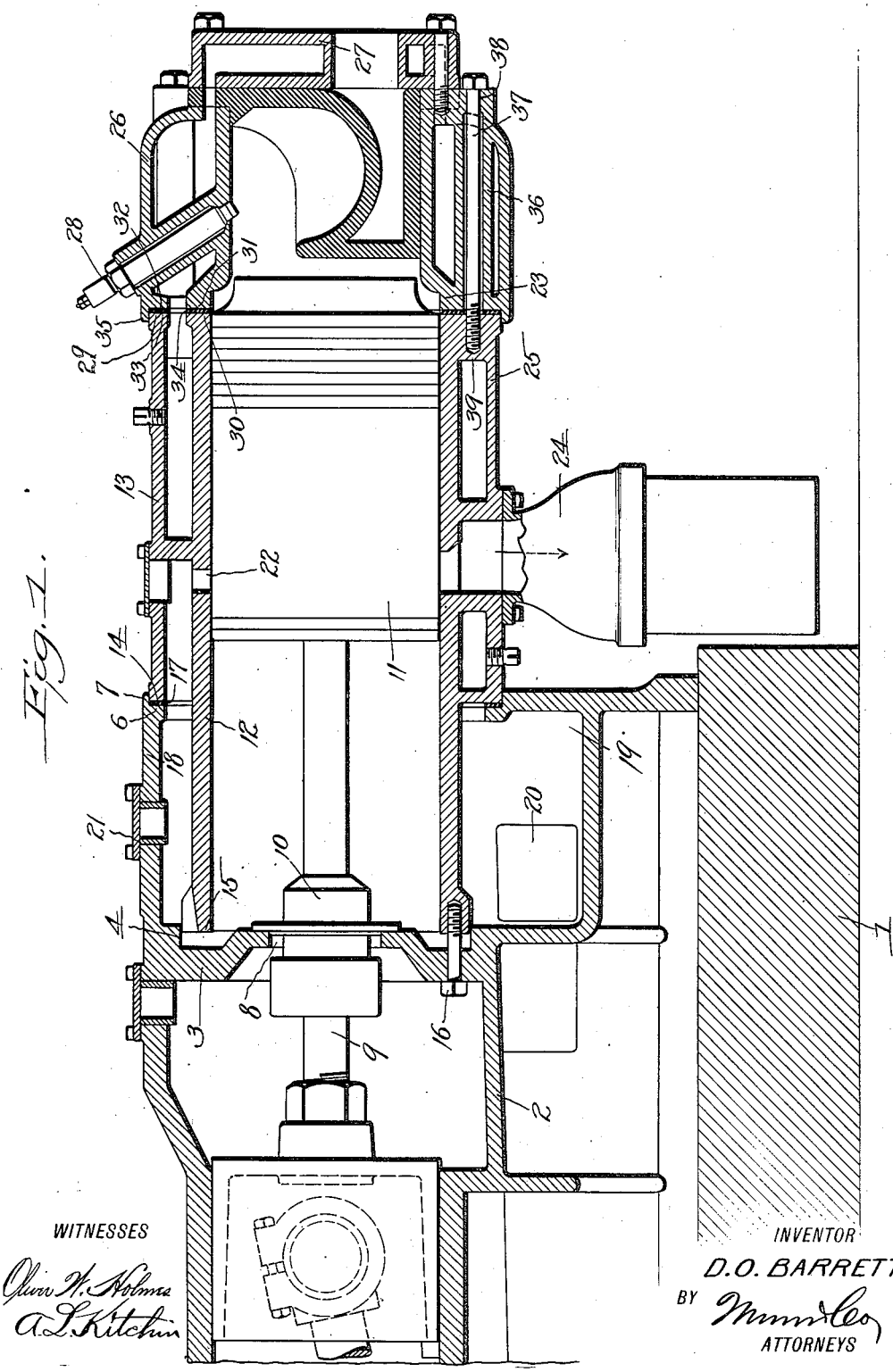
Figure 1 is a longitudinal vertical section through a body and cylinder disclosing an embodiment of the invention.
Figure 2:
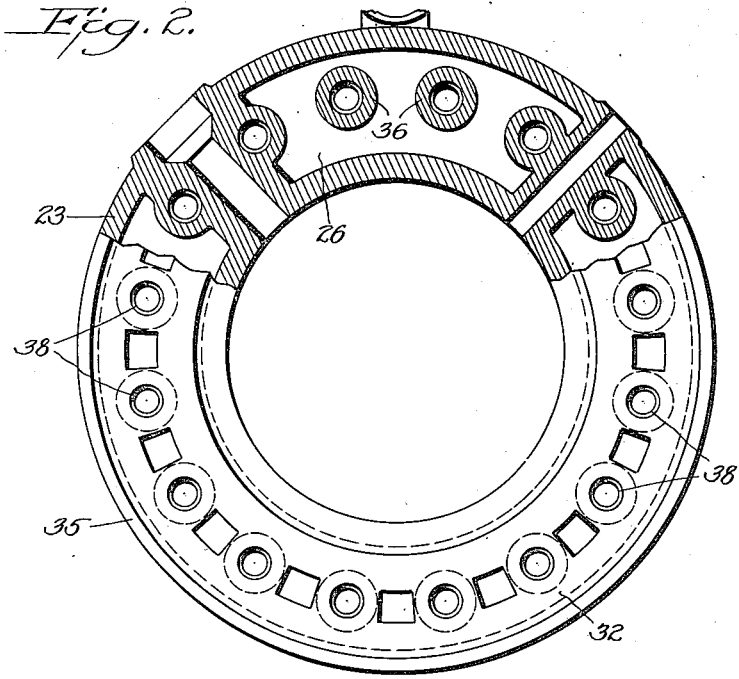
Figure 2 is an end view of the head with certain parts broken away.
Figure 3:
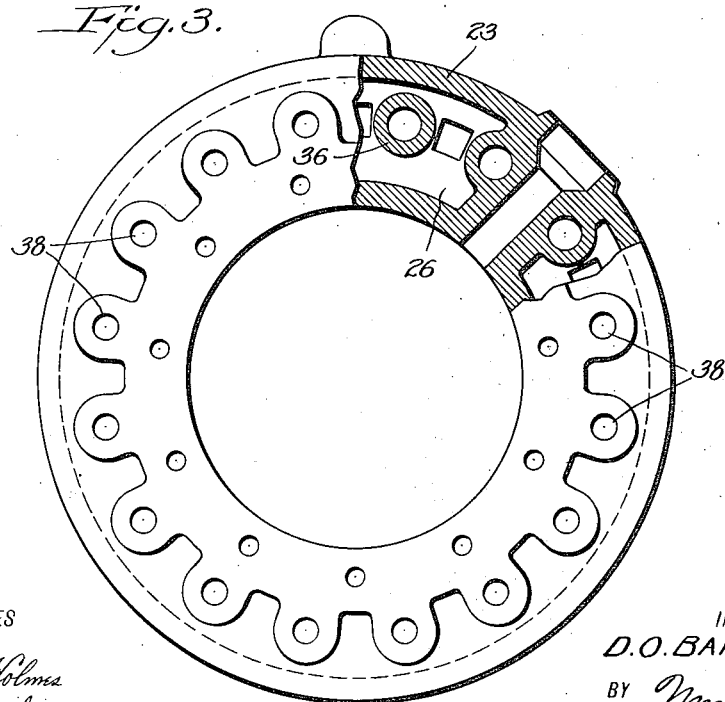
Figure 3 is an end view of the head shown in Figure 2, but looking at the same in the opposite direction, certain parts being broken away.

Referring to the accompanying drawings by numerals 1 indicates a foundation of any desired kind on which the bed 2 is mounted. The bed 2 at the cylinder end is provided with a partition 3 having an annular shoulder 4 of a certain size while the extreme end is provided with an annular shoulder 6 of a different size or diameter, shoulder 6 being provided with an overhanging annular flange 7. Partition 3 is provided with an opening 8 through which the piston rod 9 passes, said opening being provided with a packing box 10 for preventing the loss of compression when the engine is in operation. The piston rod 9 is connected with piston 11 slidingly mounted in the cylinder 12. The overhanging section 13 of the cylinder 12 is provided with a machined end 14 fitting against the shoulder 6 and within the annular flange 7, while the inner end 15 of the cylinder 12 fits within the shoulder 4 and engages the periphery thereof while the overhanging section 13 fits flatwise against the shoulder 6. A plurality of bolts 16 are provided which extend through partition 3 into the threaded sockets in cylinder 12 whereby said cylinder is drawn toward the partition 3 and thereby the shoulder 14 presses tightly against the packing 17 which in turn presses against the shoulder 6. The flange 7 positively prevents any blowing out of the packing 17 and at the same time assists the shoulder 6 in providing a tight joint in proper alignment with the cylinder.

The space between the inner end section of the cylinder 12 and the end section 18 of bed 2 is in free communication with the inlet chamber 19, said inlet chamber receiving a mixture of air and gas from any suitable source, as for instance a valve structure 20, similar to that disclosed in my Patent No. 1,292,677 issued January 28, 1919. This valve structure will permit air and gas to flow into the chamber 19, but will prevent any escape therefrom, so that as the piston 11 moves from the position shown in Figure 1 the mixture of air and gas is drawn into the space or auxiliary chamber 21, after which this explosive mixture is compressed by piston 11 moving forward on its explosion stroke. As soon as the piston reaches substantially its extreme forward position the explosive mixture will be under an appreciable pressure and will rush through the opening 22 into cylinder 12 between piston 11 and head 23 and the exhaust gases will pass out the exhaust manifold 24. The overhanging section 13 of cylinder 12 is provided with a water jacket 25 which is in free communication with the water jacket 26 of head 23, and the water jacket 26 and the head 23 is also in free communication with the end water jacket 27. A suitable spark plug 28 is provided in head 23 for causing the proper ignition at the proper time, the position of this plug and the way it is arranged forming no part of the present invention.

The outer or forward end of the cylinder 12 is provided with a machined shoulder 29 and a machined end section 30 fitting against the machined section 31 of head 23, while shoulder 29 fits against the shoulder 32. A suitable gasket 33 is provided, the gasket being held in place not only by the pressure of shoulder 29 but by the overhanging annular flange 35. It will thus be seen that the overhanging portion 13 of cylinder 12 is provided with end shoulders, the underlying flanges 7 and 35 coacting with the shoulders 6 and 32 so as to provide a tight joint and more easily and accurately set. The interior structure of the head 23 may be substantially any kind, preferably this head is cast as an integral structure. In the casting tubular members 36 are providing for receiving the clamping bolts 37 which preferably fit reasonably snug at the end 38 and which screw into threaded apertures in the various lugs 39 cast integral with the outer end of cylinder 12. In this way any of the clamping bolts 37 may be removed during the operation of the engine without disturbing any other part and without allowing the water in the cooling system to escape. In addition this arrangement is such that the bolt 37 is kept cool by the water in the water jacket. The tubular members will not in any way stop the flow of cooling water, but will on the contrary assist in transmitting the heat to said water so as to maintain the head reasonably cool at all times.

What I claim is:

The combination with a cylinder having one end enlarged exteriorly to form a shoulder, said shoulder being flush with one end of said cylinder and cooperating with the same to form a wide bearing surface, of a gasket mounted on said bearing surface and having its inner and outer edges flush with the inner wall of the cylinder and the outer wall of said shoulder, a head extending over the entire area of and flatly contacting with said gasket, said head being provided with a continuous depending flange engaging and surrounding said gasket and said shoulder respectively and forming a means to hold the gasket against spreading, said head being provided with a water jacket and a plurality of tubular members, and bolts extended through said tubular members and gaskets and threaded into said cylinder.

DWIGHT ORION BARRETT.